G. G. FLOYD.
SIX WHEELED TRUCK.
APPLICATION FILED DEC. 1, 1913.
1,100,425.
Patented June 16, 1914.
3 SHEETS—SHEET 1.
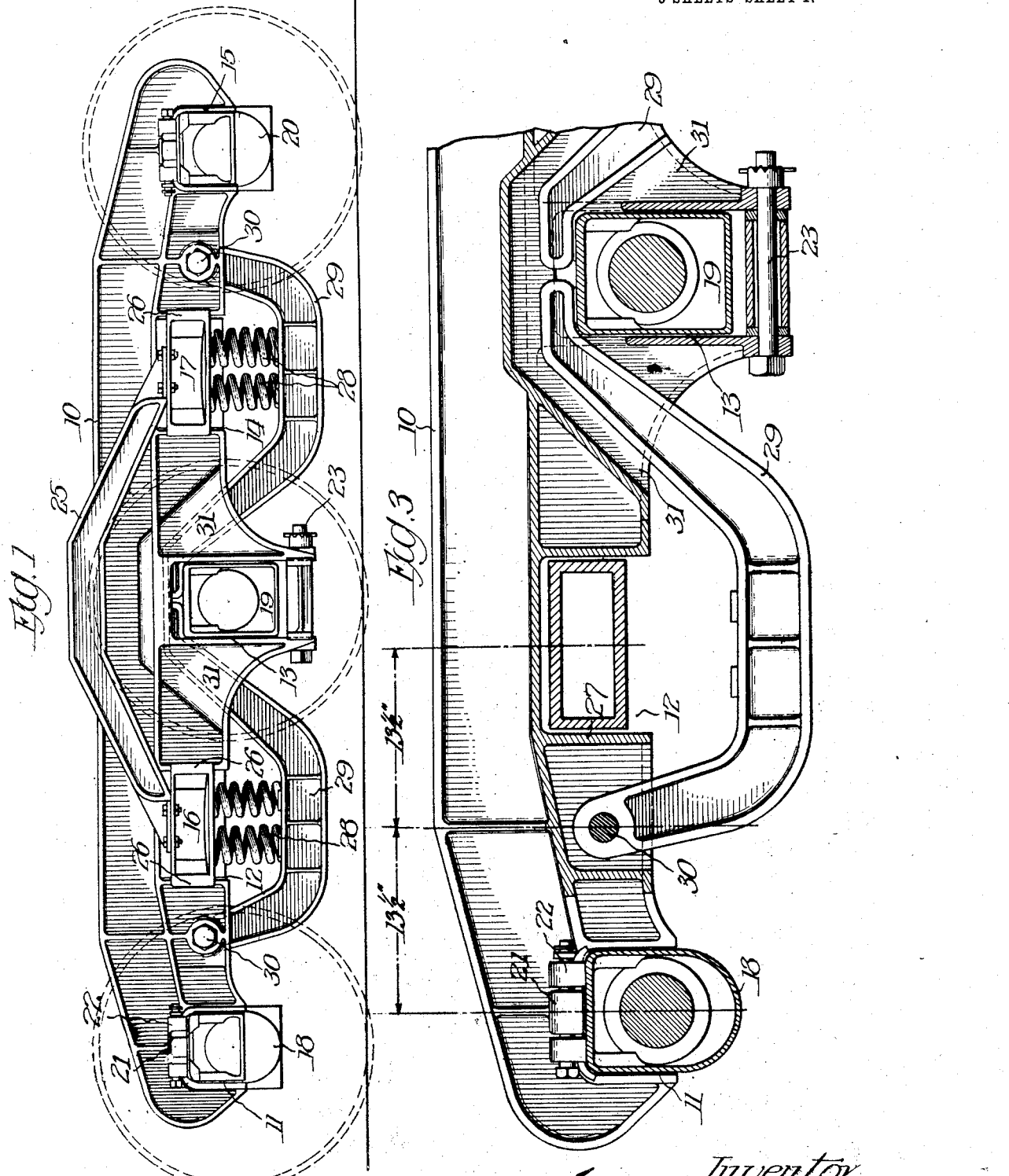

G. G. FLOYD.
SIX WHEELED TRUCK.
APPLICATION FILED DEC. 1, 1913.
1,100,425.
Patented June 16, 1914.
3 SHEETS—SHEET 2.
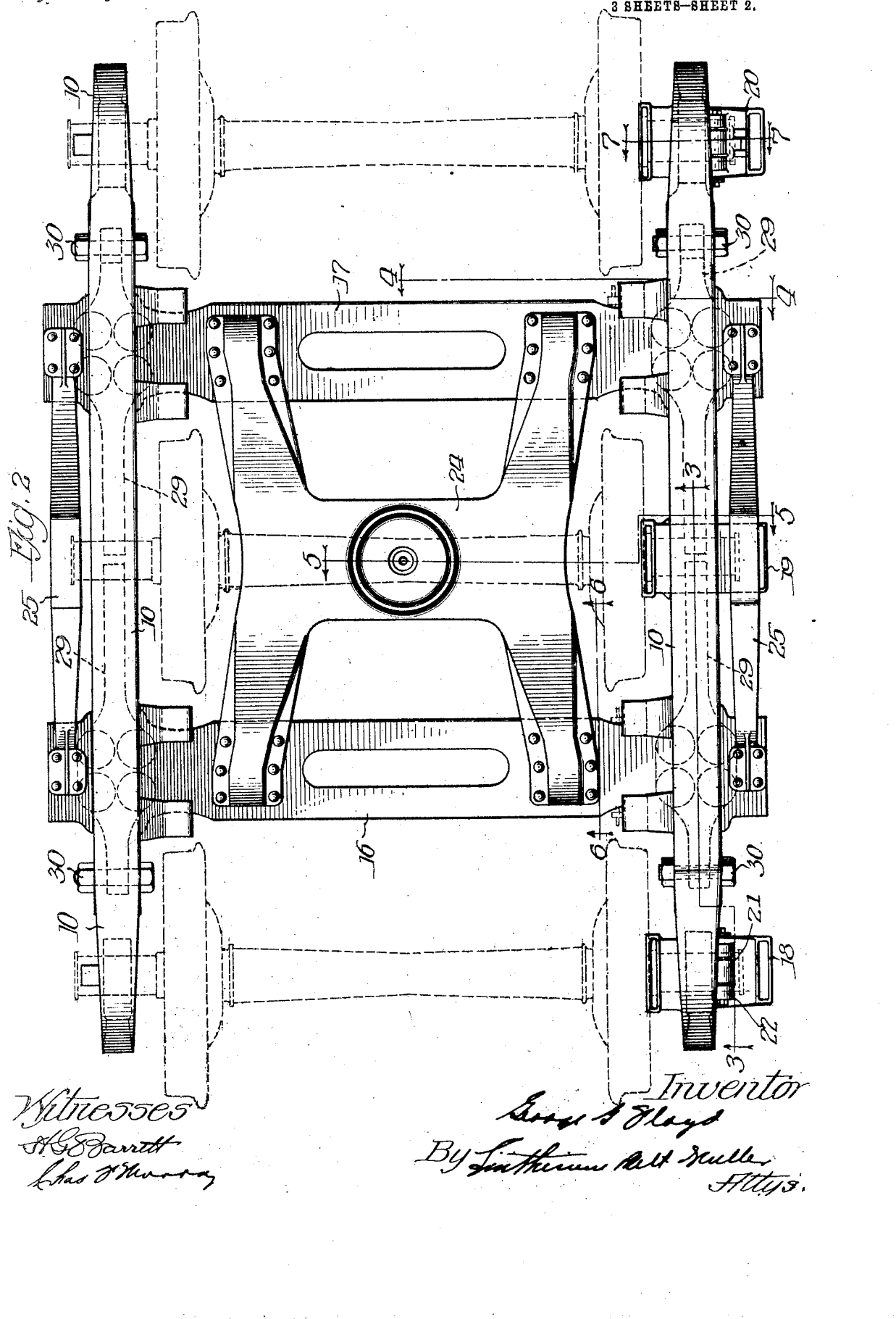

G. G. FLOYD.
SIX WHEELED TRUCK.
APPLICATION FILED DEC. 1, 1913.
1,100,425.
Patented June 16, 1914.
3 SHEETS—SHEET 3.
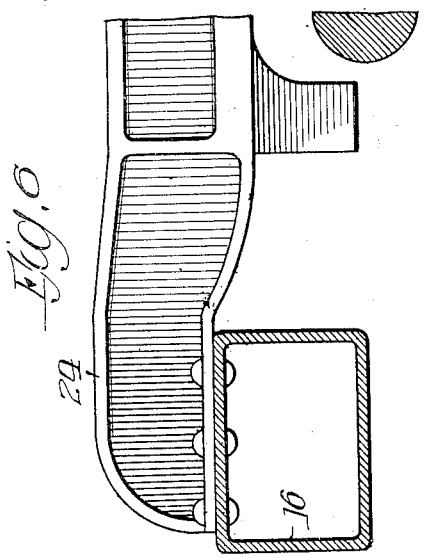
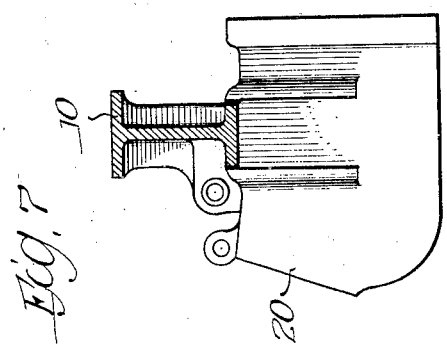
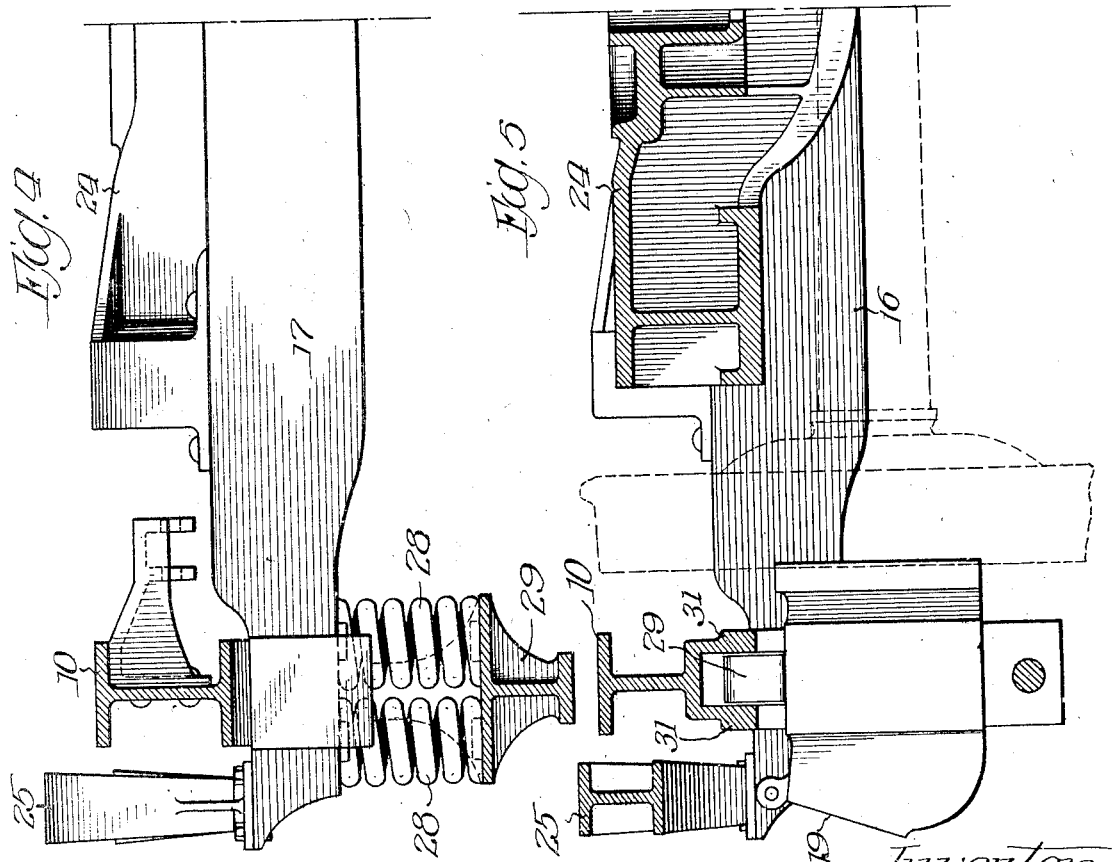

UNITED STATES PATENT OFFICE.

GEORGE G. FLOYD, OF CHICAGO, ILLINOIS, ASSIGNOR TO AMERICAN STEEL FOUNDRIES, OF NEW YORK, N. Y., A CORPORATION OF NEW JERSEY.

SIX-WHEELED TRUCK.

1,100,425.

Specification of Letters Patent. Patented June 16, 1914.

Application filed December 1, 1913. Serial No. 803,870.

*To all whom it may concern:*

Be it known that I, GEORGE G. FLOYD, a citizen of the United States, and resident of Chicago, in the county of Cook and State of Illinois, have invented certain new and useful Improvements in Six-Wheeled Trucks, of which the following is a specification.

My invention relates to trucks for railway cars and has particular reference to a novel six wheeled truck.

In the construction of trucks for passenger coaches particularly trucks of the six wheeled type, it has been found necessary to largely increase the capacity due to increases in weight, running speed etc., the tendency being toward cast steel construction with a minimum number of parts. It is furthermore desirable that a certain rigidity should be secured as to vertical stresses with a degree of flexibility permitting movement of the truck parts due to unevenness in track surfaces and the turning of curves. This is secured in the present structure by providing a pair of integral cast steel side frame members having recesses in their lower faces, these recesses accommodating journal boxes and transverse bolsters, the sole connecting means for the two side frame members consisting in the axles and the bolsters. Thus the truck is permitted quite extended flexure without undue strain on the parts, which flexibility would not be possible if the side frame members were rigidly connected.

A further object in the present construction lies in the location and mounting of the equalizer bars by means of which the load is transmitted to the wheels. In this construction the equalizer bars are pivoted at one end to the side frame the free end of each of the bars resting on the top of the journal box for the center pair of wheels. By this means a much shorter equalizer bar is possible with a better distribution of the weight, the frame member carrying a portion of the load transmitting it to the end journal box.

A still further object is in the manner of mounting the bolsters, the bolsters being guided in recesses open at their bottoms, provided in the side frame member, the bolster through its guides acting to tie the frames together as in the case of four wheeled trucks of the well known type.

Other and further objects will appear hereinafter and will be more particularly pointed out in the claims.

My invention will be more readily understood by reference to the accompanying drawings, wherein, Figure 1 is a side elevation of a six wheeled truck constructed in accordance with my invention; Fig. 2 is a plan view of the construction shown in Fig. 1; Fig. 3 is an enlarged sectional elevation taken on the line 3—3 of Fig. 2; Fig. 4 is likewise an enlarged cross sectional view taken on the line 4—4 of Fig. 2; Fig. 5 is a similar view taken on the line 5—5 of Fig. 2; Fig. 6 is a transverse section showing the transverse bolster and a portion of the double bolster, the view being taken on the line 6—6 of Fig. 2, and, Fig. 7 is a view showing the cross sectional construction of a side frame member, the view being taken on the line 7—7 of Fig. 2.

Referring more particularly to the drawings it will be seen that I provide side frame members 10, 10, each thereof being provided with open ended recesses 11, 12, 13, 14, 15, the recesses 12 and 14 accommodating the ends of transverse bolsters 16, 17, respectively, whereas the recesses 11, 13, 15, accommodate journal boxes 18, 19, 20. Means are provided such as the registering apertured lugs 21, 22, on the side frame and journal boxes respectively for connecting the two end journal boxes 18, 20, rigidly to the frame 10. The journal box 19 is permitted limited vertical reciprocation within its recess 13. a bolt 23, preventing possible accidental disengagement of the journal box from the frame. The bolsters 16, 17, are connected by means of a cast double bolster 24, suitably riveted thereto, also by means of side bearing connecting bars 25. The ends of the bolster are provided with guides 26, these guides coöperating with the adjacent walls forming columns 27, in the side frame members, this inter-connection serving to tie the side frame members together at the same time permitting a degree of desired flexibility. The bolsters are supported on suitable springs 28, these springs having a bearing on the equalizer bars 29, one end of which is pivoted at 30, to the side frame member. The free ends of the bars extend through guides 31, in the form of webs integral with the side frame member and rest upon the journal box 19. It will be noted that the transverse bolsters are mounted exactly midway of the distance between adjacent axles and that notwithstanding this advantage of location, the load transmitted to the center axle is equal to the load transmitted to the two outer axles. This advantage is secured because of the pivoting of the equalizer bars 29 to the frame at a point midway betwen the center of the bolster and the center of the end axle. Thus only one third of the load from each bolster is transmitted to the center axle, the remaining two-thirds being transmitted to the end axles. This is shown graphically in Fig. 3, the dimensions given being such as are used in a full sized six wheeled tender truck with nine foot wheel base.

Preferably the section of the side frame member is as shown in Figs. 4, 5, and 7, that is, I-shaped although other sections may be used to advantage. At a point contiguous to the middle recess 13 the web of the side frame is split as shown in Fig. 5, to form the guides 31 for the equalizer bar 29. The transverse bolster may be of the box type, as shown in Fig. 6, or of other approved cross section.

I claim:

1. In a six wheel truck, the combination of a pair of one piece side frames, each having transverse bolster openings providing columns, transverse bolsters connecting said frames and having guide lugs at their ends for engagement with said columns, and a double bolster connecting said transverse bolsters, substantially as described.

2. In a six wheel truck, the combination of two integral side frames, each frame having three journal box receiving recesses, said frames being provided with transverse openings, the vertical side walls of which provide columns, transverse bolsters connecting said frames and having guide lugs at their ends for engagement with said columns, and a double bolster connecting said transverse bolsters, substantially as described.

3. In a six wheel truck, the combination of a pair of side frames each frame being provided with three journal box receiving recesses, bolsters mounted for guidance and vertical reciprocation in other recesses in said frames, equalizer bars pivoted at one end to said frames and at the other end bearing on a journal box, and springs between said bolsters and said equalizer bars, substantially as described.

4. A side frame member for six wheel trucks consisting of a single casting having a plurality of transverse recesses therein said recesses being open at their lower ends, the recesses at the middle and outer ends of the frame being adapted to accommodate journal boxes, the intermediate recesses being adapted to accommodate and permit vertical reciprocation of transverse bolsters, substantially as described.

5. In a six wheel truck, the combination of integral side frames having pedestals for the accommodation of journal boxes, means for rigidly holding journal boxes in the end pedestals, the journal box in the middle pedestal being permitted vertical reciprocation, bolster receiving recesses, the side walls of which act as columns, and bolsters guided in said recesses, said bolsters assisting in tying the side frames together, substantially as described.

6. In a six wheel truck, the combination of a frame member composed of a single casting having journal box and bolster receiving recesses, equalizer bars each thereof being pivoted by one end to said frame at a point between a bolster recess and the end of the frame, substantially as described.

7. In a six wheel truck, the combination of a frame member composed of a single casting having journal box and bolster receiving recesses, equalizer bars each thereof being pivoted by one end to said frame at a point between a bolster recess and the end of the frame, the free ends of said bars projecting between guides into the plane of the middle journal box recess, substantially as described.

8. In a six wheel truck, the combination of one piece side frame members having recesses for the accommodation of journal boxes and bolsters, bolsters extending between said side frames, equalizer bars pivoted to said side frame members, the pivotal points of each equalizer bar being located at a point substantially midway between the centers of the bolster and end journal box, substantially as described.

9. In a six wheel truck, the combination of one piece side frame members having recesses for the accommodation of journal boxes and bolsters, transverse bolsters extending between said side frames and located in said frame at a point midway between the journal boxes, equalizer bars pivoted to said frame and having a bearing on the middle journal box, the pivotal point of each equalizer bar being located substantially midway between the centers of its adjacent bolster and the end journal box, substantially as described.

Signed at Chicago, county of Cook, State of Illinois, this 28th day of November, 1913.

GEORGE G. FLOYD.

Witnesses:
CHAS. F. MURRAY,
T. D. BUTLER.